United States Patent [19]

Bentley, Jr.

[11] Patent Number: 4,484,024
[45] Date of Patent: Nov. 20, 1984

[54] OVERCOATED BULKY SLEEVING AND ELECTRICAL INSULATION METHOD

[75] Inventor: William H. Bentley, Jr., Rosemont, Pa.

[73] Assignee: Raychem Corporation, Menlo Park, Calif.

[21] Appl. No.: 579,758

[22] Filed: Feb. 15, 1984

Related U.S. Application Data

[63] Continuation of Ser. No. 311,722, Oct. 15, 1981, abandoned.

[51] Int. Cl.³ .................. H01B 3/48; H01B 13/06; H01R 43/00
[52] U.S. Cl. ................... 174/121 R; 138/123; 138/124; 156/49; 156/51; 174/84 R; 174/124 GC
[58] Field of Search ........... 174/84 R, 110 E, 110 V, 174/110 S, 110 SR, 121 R, 121 SR, 122 R, 122 G, 122 C, 124 R, 124 G, 124 GC; 156/285, 49, 51, 52; 138/123, 124, 125

[56] References Cited

U.S. PATENT DOCUMENTS

| Re. 25,241 | 9/1962 | Randolph | 156/194 |
|---|---|---|---|
| 1,936,519 | 11/1933 | Meiwald | 174/124 R |
| 2,030,160 | 2/1936 | Titcomb | 156/51 |
| 2,111,639 | 3/1938 | Petersen | 174/124 R |
| 2,144,887 | 1/1939 | Meiwald | 174/124 R |
| 2,171,334 | 8/1939 | Fuoss | 174/110 V |
| 2,207,579 | 7/1940 | Carl | 174/122 G |
| 2,209,850 | 7/1940 | Shand | 174/124 GC |
| 2,217,832 | 10/1940 | Barrans | 174/124 R |
| 2,234,560 | 3/1941 | Keyes | 174/122 R |
| 2,260,024 | 10/1941 | Hall et al. | 138/125 |
| 2,365,019 | 12/1944 | Stewart | 174/121 SR |
| 2,691,694 | 10/1954 | Young | 174/121 R |
| 2,956,613 | 10/1960 | Edelman et al. | 174/110 E |
| 3,043,738 | 7/1962 | Demeter et al. | 156/285 |
| 3,192,309 | 6/1965 | Zoder | 174/121 R |
| 3,950,452 | 4/1976 | Schmidt et al. | 174/110 SR |
| 4,084,065 | 4/1978 | Swenson | 174/124 R |
| 4,340,090 | 7/1982 | Matsushita et al. | 138/123 |

FOREIGN PATENT DOCUMENTS

| 478936 | 11/1951 | Canada | 171/121 |
|---|---|---|---|
| 520246 | 4/1940 | United Kingdom | 174/124 GC |
| 514726 | 6/1976 | U.S.S.R. | 156/285 |

OTHER PUBLICATIONS

Sanders, abstract of Ser. No. 2,318, filed Jan. 14, 1948, published in OG 668, p. 538, on Mar. 10, 1953.

Primary Examiner—John Gonzales
Assistant Examiner—Morris H. Nimmo
Attorney, Agent, or Firm—T. Gene Dillahunty; Douglas A. Chaikin; Herbert G. Burkard

[57] ABSTRACT

An electrically insulating, overcoated bulky sleeve is disclosed comprising a tubular sleeve prepared from bulky (i.e. low density, high surface area) continuous filament yarns and an overcoating. When an electrical conductor is positioned therewithin, the large surface area of the bulky yarns of the interior of the sleeve provides an intimate fit for an expanded range of conductor diameters. For applications where a void-free impregnation of the sleeve interior between the overcoating and the conductor is desired, the large interior surface area of these sleeves can promote retention of the impregnation composition. The overcoated sleeve can be expandable, deforming to allow pull-back and return or fold-over, and/or conforming to accept transitions in conductor diameter. The overcoated bulky sleeve can be employed in a method for electrically insulating a conductor, which method may further include an interstitial impregnation step.

33 Claims, 5 Drawing Figures

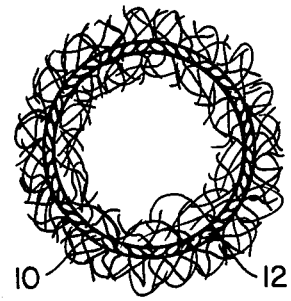
FIG_1
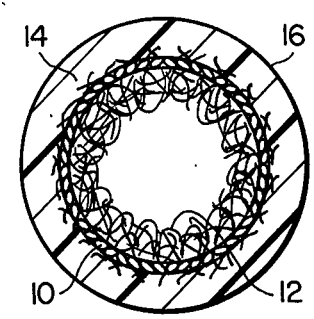
FIG_2
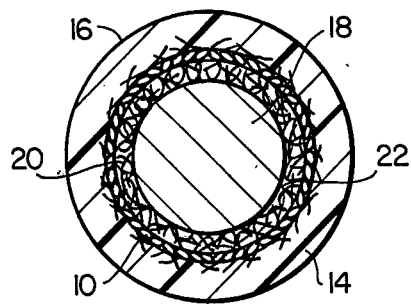
FIG_3
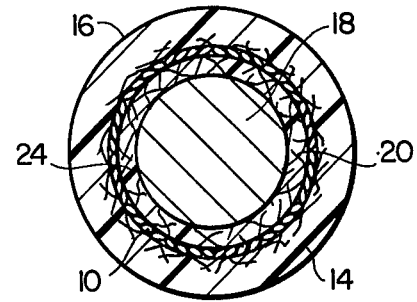
FIG_4
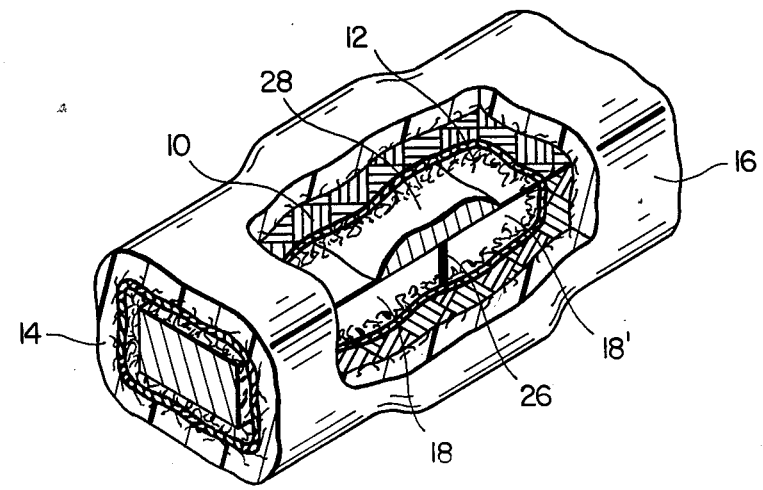
FIG_5

OVERCOATED BULKY SLEEVING AND ELECTRICAL INSULATION METHOD

This application is a continuation, of application Ser. No. 311,722, filed Oct. 15, 1981 abandoned.

BACKGROUND OF THE INVENTION

1. Field of the Invention

This invention relates to electrical insulation, and more particularly to an overcoated bulky sleeve and a method for electrical insulation of electrical conductors using said sleeve.

2. Discussion of the Art

The various functional devices and/or circuits within an electrical apparatus are generally electrically interconnected by elongated electrical conductors (e.g. wires, bus bars, cables, etc.) which are tupically electrically insulated. Electrical insulation serves to isolate the conductor from potentially disruptive environmental factors of a mechanical, electrical or chemical nature thereby insuring that current flows when and where desired without interruption.

Electrical insulation is generally provided either before or after interconnection of the conductor within the electrical apparatus. Prior to interconnection, the insulation material, generally polymeric in nature, may be coated or extruded directly onto and around the elongated conductor. Such insulation is generally partially removed, usually from the extrmities, as an interconnection is made to or within the electrical apparatus. Alternately, bare conductors or exposed interconnection points of otherwise insulated conductors may be insulated after interconnection by coating (for example, with a polymeric material), wrapping with an insulating tape, fitting with an insulating sleeve or cap, or impregnating a porous tape or sleeve with an insulating material such as a polymeric material either before or after positioning it on the conductor.

An electrical motor is one example of an electrical apparatus having electrical conductors which interconnect the various functional devices and/or circuits within the apparatus. The coil leads and the phase connectors which connect the quadrants of the coils of the motor are examples of electrical conductors within the motor which require insulation.

The stator of the motor is generally insulated by resin impregnation applied by a vacuum/pressure impregnation process, and is preferably void-free. Resin is forced into the interstitial areas by alternately pulling a vacuum, then applying pressure. Before the stator is impregnated, the motor is generally assembled and pretested. Conductor insulation must be in place during pretest where short term voltages on the order of 6,000 to 8,000 volts may be applied for on the order of a microsecond. Insulating sleeves which are deformably expandable and can be pulled-back along the length of the conductor so that permanent interconnections can be made subsequent to the temporary connections of pretest, are (for this application and many other applications) generally preferred to tape or other types of retrofitted insulation. The interiors of insulation sleeves associated with the conductors of the stator are generally resin impregnated at the same time that the stator is impregnated. Sleeve impregnation is also preferably void-free, but resin outflow due to gravity before the resin cures is known to occur and to result in an imperfect impregnation, especially where low viscosity resins are used for penetration of complex structures.

An electrical motor also provides a good example of the possible mechanical, electrical or chemical environmental forces which can cause insulation failure, even failure of insulation sleeves which offer many obvious design advantages over other types of post-interconnection conductor insulation. Insulation failure may be due to mechanical forces induced by electromagnetic torque or to vibration-induced wearing-away of the insulation against other components of the electrical apparatus. Thermal expansion and contraction may cause wear. Localized overheating due to the presence of air or vapor pockets which reduce heat transfer may accelerate thermal degradation of the insulation materials and induce stress cracking. Oxygen or ozone from electric discharges may enter and cause oxidative degradation of polymeric materials. Water may enter and corrode metal parts or short circuit conductors.

Electrically insulating sleeves are tubular structures fabricated from electrically insulating materials. The simplest sleeve is a one-component tube composed of, for example, a polymeric material, a ceramic material, or an interthreaded yarn (i.e. a braid, a knit, or a woven and sewn fabric). The insulation value and wear-resistance of insulating sleeves may be improved by providing a dense, thick-walled sleeve or a plurality of nested sleeves of varying diameters. Alternately, composite sleeves may be employed such as a braided fiberglass sleeve overcoated with a polymeric material or a plurality of overcoatings of polymeric materials.

The insulation value and wear-resistance of a sleeve may be further improved by impregnation of a porous sleeve with an impregnation composition, for example, a resin, prior to installation of the sleeve around a conductor. After installation the resin-rich pre-impregnated sleeve is compressed against the conductor thereby forcing resin out of the sleeve to improve contact with the conductor. Alternately the interstices of the sleeve and/or between the sleeve and the conductor may be impregnated with an impregnation composition, such as by means of the previously discussed, well-known vacuum/pressure impregnation process wherein the impregnation composition is forced into the interstitial areas by alternately pulling a vacuum, then applying pressure.

Sleeves are generally selected to have the smallest possible diameter that will fit over the conductor to be placed therewithin, thereby improving the electrical insulation value and wear-resistance by improving the contact of the sleeve with the conductor. Bulky sleeves having a bulky interior, such as a braided asbestos sleeve, are known and have been used for electrical as well as thermal insulation. These provide a more intimate fit with the conductor therewithin.

Staple fiber yarn braids are more difficult to manufacture than continuous filament yarn braids because of their tendency to fibrillate even through spun into a filament. Staple fibers are fibers of shorter length, whether natural or man-made. For example, staple fiberglass is 6 to 15 inches long and staple asbestos is up to 12 inches long. All natural fibers except for silk are staple fibers.

The spun filaments of natural fiber staple yarns have a high intrinsic surface area compared to man-made continuous filament yarns. Natural fiber yarns therefore tend to absorb and/or to surface absorb more water than man-made continuous filament yarns. This characteristic detrimentally influences their dielectric properties and renders them less desirable for electrical insulation sleeving, even when such sleeving is overcoated. Moreover, surface water must be removed before a natural fiber yarn sleeve is impregnated with most impregnation compositions.

SUMMARY OF THE INVENTION

The purpose of the instant invention is to provide an overcoated bulky sleeve, an electrically insulated electrical conductor, an electrical apparatus having at least one electrically insulated electrical conductor, and a method for insulation of electrical conductors using said sleeve. This novel sleeve comprises a tubular bulky sleeve interthreaded from bulky (i.e low density, high surface area) continuous filament yarns and an overcoating, preferably a dielectric overcoating. The overcoated bulky sleeve may be expandable, deforming when positioned around a conductor to allow pull-back from the end of the conductor and return or fold-over. The sleeve also may deformably/conformably expand to accept conductor joints, while remaining substantially in intimate contact with the conductor by virtue of its' interior bulkiness thereby providing a flexible cushion against wear. An electrical conductor so insulated may be impregnated with an impregnation composition, the large surface area of the interior of the sleeve promoting retention of the impregnation composition. A method for insulation of electrical conductors using this sleeve and an impregnation composition is also disclosed.

To accomplish this purpose an overcoated bulky sleeve for electrical insulation of an electrical conductor is provided, comprising:
(a) a tubular sleeve which is electrically insulating, has a bulky interior having a large surface area, and is interthreaded from low density, bulky, continuous filament yarns; and
(b) an overcoating which is coated onto and substantially covers and seals the exterior surface of the tubular sleeve.

In another aspect, the invention provides for an electrically insulated electrical conductor, comprising:
(a) an electrical conductor which is elongate; and
(b) an overcoated bulky sleeve which surrounds and intimately contacts said conductor, and comprises:
  (i) a tubular bulky sleeve which is electrically insulating, has a bulky interior having a large surface area, and is interthreaded from low density, bulky, continuous filament yarns; and
  (ii) an overcoating which is coated onto and substantially covers and seals the exterior surface of the tubular sleeve.

In yet another aspect, the invention provides for an electrical apparatus having at least one electrically insulated electrical conductor, comprising:
(a) an electrical apparatus having at least one electrical conductor;
(b) an insulating bulky sleeve for each conductor to be insulated, which sleeve surrounds and intimately contacts said conductor, and comprises:
  (i) a tubular bulky sleeve which is electrically insulating, has a bulky interior having a large surface area, and is interthreaded from low density, bulky, continuous filament yarns; and
  (ii) an overcoating which is coated onto and substantially covers and seals the exterior surface of the tubular sleeve; and
  (c) an impregnation composition which is electrically insulating and substantially fills the interior of the sleeve between the electrical conductor and the overcoating.

In still another aspect, the invention provides a method for electrically insulating an elongate electrical conductor, comprising the steps of:
(a) selecting an overcoated bulky sleeve having an inside diameter which allows intimate contact of the interior of the sleeve with the exterior of the electrical conductor to be electrically insulated, said overcoated bulky sleeve comprising:
  (i) a tubular sleeve which is electrically insulating, has a bulky interior having a large surface area, and is interthreaded from low density, bulky, continuous filament yarns; and
  (ii) an overcoating which is electrically insulating and is coated onto and substantially covers and seals the exterior surface of the tubular sleeve; and
(b) positioning a length of said overcoated bulky sleeve around at least a portion of said electrical conductor, thereby electrically insulating said conductor.

The method may further comprise the step of substantially filling the interior of the sleeve by introducing an electrically insulating impregnation composition between the electrical conductor and the overcoating.

BRIEF DESCRIPTION OF THE DRAWING

The invention may be better understood by referring to the detailed description of the invention when taken in conjunction with the accompanying drawing in which:

FIG. 1 is a cross-sectional view of a bulky tubular sleeve which has been braided from low density, high surface area continuous filament yarns, but which has not yet been overcoated.

FIG. 2 is a cross-sectional view of an overcoated bulky sleeve.

FIG. 3 is a cross-sectional view of an overcoated bulky sleeve which has been positioned around an electrical conductor.

FIG. 4 is a cross-sectional view of an overcoated bulky sleeve which has been positioned around an electrical conductor and an impregnation composition introduced through the open ends thereof to substantially fill the interior of the sleeve between the electrical conductor and the overcoating.

FIG. 5 is a cut-away perspective view of an overcoated bulky sleeve positioned around and conforming to the contours of a rectangular bus bar, the cut-away showing a butt-style interconnection which has been soldered and around which the overcoated bulky sleeve has deformably expanded to accept the greater circumference of the interconnection.

DETAILED DESCRIPTION OF THE INVENTION

Tubular sleeves, such as those interthreaded by braiding or knitting, are generally comformable and at least diametrically expandable. They conform to the general contours of an object, such as an elongate object, placed within. They conformably/deformably expand to accept diameter transitions of an object placed within. Such sleeves may be overcoated with a flexible and/or expandable material, such as an expandable polymeric material, for example an acrylic, urethane, vinyl, or silicone polymer, and still retain a fair measure of conformability and diametric expandability. The overcoating moreover are preferably electrically insulating. The sleeves may be overcoated by any suitable process, such as an extrusion process or a solution coating process. Such are the overcoated sleeves of this invention, which furthermore are interthreaded from low density, bulky, continuous filament yarns.

Bulky sleeves may be fabricated from bulky organic or bulky inorganic continuous filament yarns. Where they are to be used for electrical insulation of electrical conductors, they must be electrically insulating, such as the electrical grades of fiberglass or of polyester yarns. The sleeves useful in this invention are interthreaded from bulky continuous filament yarns, that is, yarns having a low density and a high surface area. These yarns typically have a density of about 70% or less, preferably from about 40% to about 60%, and most preferably from about 45% to about 55% of the density of non-bulky yarns of the same composition and diameter. The interior of sleeves interthreaded from such yarns have a large surface area. The term interthreading is used herein to mean any method of threading together yarns to produce a sleeve and includes but is not limited to braiding and knitting.

Man-made inorganic yarns may be rendered bulky as previously defined, by known texturizing processes. Textured fiberglass yarn products are commercially available from, for example, PPG Industries, Inc., Fiberglass Division, under the product designations TEX-TO ™ and L.E.X. yarns. These textured yarns have lower density, higher bulk, thickness and coverage per pound than standard filament glass yarns, while still being of the continuous, multistrand type. Bulky, electrical grade fiberglass yarns are preferred for the bulky sleeves according to this invention, especially because of the high thermal conductivity characteristic of fiberglass, which allows rapid dissipation of heat.

Man-made organic yarns may be rendered bulky as previously defined, by for example a false-twisting process. Continuous, multi-strand polyester yarns, by way of illustration but not limitation, are twisted together and heat treated to impart a shape, subsequently untwisted, and recombined, thereby producing a bulkier final yarn product. Bulky, electrical grade polyester yarns are preferred for the bulky organic yarn sleeves according to this invention, especially where a polyester impregnation composition will be employed in the insulation process.

The interior bulkiness of the sleeves according to this invention allows intimate contact of the interior of the sleeve with the exterior of an electrical conductor to be electrically insulated placed therewithin. The interior bulkiness provides a flexible cushion which markedly reduces insulation failure due to mechanical forces, such as vibration-induced wearing-away of the insulation against other components of an electrical apparatus, thereby extending the useful life expectancy not only of the insulation but of the electrical apparatus itself.

The interior of an overcoated bulky sleeve according to this invention when positioned around an electrical conductor may be advantageously impregnated with an impregnation composition, such as a polymer, for some applications. Useful polymers, by way of illustration but not limitation, include thermal setting resins, such as epoxies, phenolics, polyesters and urethanes. These reactive systems may be cured with time or by the application of heat, rendering the reactive components into a less reactive or non-reactive thermoset resin. The large surface area of the interior of the sleeves according to this invention promotes resin retention and surprisingly, substantially void-free impregnations may be obtained.

An overcoated bulky sleeve according to this invention moreover provides a path for the introduction of impregnation composition by allowing introduction only through the open ends of the sleeve. Introduction of the impregnation composition may be by gravity, by the application of pressure, by aspiration by means of a vacuum, or the well known vacuum/pressure impregnation process previously discussed. When the impregnation composition is introduced by means of the vacuum/pressure impregnation process a homogeneous, substantially void-free insulated electrical conductor results and is a preferred method for the practice of this invention.

It is desirable that the sleeves be sufficiently expandable to allow the sleeve to be temporarily pulledback along the electrical conductor to facilitate interconnection with the electrical apparatus and to be repositioned along the electrical conductor after interconnection with the electrical apparatus. Conductor interconnection with the electrical apparatus may be by means of soldering, welding, brazing, bolting, or any other means. It is especially preferable that the sleeve be sufficiently expandable to allow the sleeve to be repositioned over the interconnection thereby electrically insulating the electrical conductor along its length and its interconnection with the electrical apparatus as well. The ratio of the circumference of the interconnection to the circumference of the electrical conductor is generally on the order of two to one, but may be as high as three to one, such as where bus bars are overlapped and bolted together. The overcoated bulky sleeves of this invention are sufficiently deformably/conformably expandable to accommodate such transitions.

Referring to FIG. 1, shown in cross-section is a tubular bulky sleeve 10 which has not yet been overcoated. The sleeve was braided from low density, high surface area, continuous filament fiberglass yarns, although other interthreading methods are previously described are employable. The sleeve interior shown generally at 12 has a large surface area. FIG. 2 shows the same tubular bulky sleeve 10 after it has been overcoated with an overcoating 14 as previously described which is an acrylic polymer, to produce an overcoated bulky sleeve 16 according to this invention. Any coating method which substantially covers and seals the exterior surface of the tubular bulky sleeve 10 is satisfactory, such as an extrusion coating method or a solution coating method.

Referring to FIG. 3, shown in cross-section is an overcoated bulky sleeve 16 after it has been positioned around an electrical conductor 18. The fit of the sleeve 16 is important. The sleeve 16 should be selected to have an inside diameter which allows intimate contact of the interior of the sleeve 16 with the exterior of the electrical conductor 18 to be insulated. The interstices 20 are defined by the continuous yarn fibers 22 of the interior of the sleeve 12 as they intimately contact the electrical conductor 18. It is the collective flexible cushioning effect of the overcoated bulky sleeve 16 which provides the desired resistance to mechanical deterioration as well as the desired electrical insulation.

Referring to FIG. 4, the overcoated bulky sleeve 16 of FIG. 3 has been impregnated with an impregnation composition 24 to substantially fill the interstices 20 of the sleeve interior 12 between the electrical conductor 18 and the overcoating 14. Impregnation may be accomplished by any of the methods previously described. When a vacuum/pressure impregnation process is used, a homogeneous, substantially void-free insulated electrical conductor 18 is provided as shown in FIG. 4.

Referring to FIG. 5, the conformable/deformable expandability of the overcoated bulky sleeve 16 according to this invention is demonstrated. FIG. 5 is a cutaway perspective view of an overcoated bulky sleeve 16 positioned around and conforming to the contours of a rectangular bus bar 18. The rectangular bus bar 18 has been joined to another rectangular bus bar 18' to form a butt-style interconnection 26 which has been soldered, the excess solder mass shown generally at 28. The overcoated bulky sleeve 16 has deformably expanded to accept the greater circumference of the interconnection 26.

While the instant invention has been described by reference to what is believed to be the most practical embodiments, it is to be understood that the invention may embody other specific forms not departing from the spirit of the central characteristics of the invention. It should be understood that there are other embodiments which possess the qualities and characteristics which would generally function in the same manner and should be considered within the scope of this invention. The present embodiments therefore should be considered in all respects as illustrative but not restrictive, the scope of the invention being limited solely to the appended claims rather than the foregoing description and all equivalents thereto being intended to be embraced therein.

I claim:

1. An overcoated bulky sleeve for electrical insulation of an electrical conductor comprising:
   (a) a tubular sleeve which has a bulky interior and which is interthreaded from bulky, continuous filament yarn having a density of about 70% or less of the density of non-bulky yarn of the same composition and diameter; and
   (b) an overcoating which is coated onto and substantially covers and seals the exterior surface of the tubular sleeve.

2. A sleeve according to claim 1, wherein the interthreaded sleeve comprises a braided sleeve.

3. A sleeve according to claim 1, wherein the interthreaded sleeve comprises a knitted sleeve.

4. A sleeve according to claim 2, wherein the continuous filament bulky yarn is an inorganic yarn.

5. A sleeve according to claim 4, wherein the inorganic yarn is a fiberglass yarn.

6. A sleeve according to claim 2, wherein the continuous filament bulky yarn is an organic yarn.

7. A sleeve according to claim 6, wherein the organic yarn is a polyester yarn.

8. A sleeve according to claim 3, wherein the continuous filament bulky yarn is an inorganic yarn.

9. A sleeve according to claim 8, wherein the inorganic yarn is a fiberglass yarn.

10. A sleeve according to claim 3, wherein the continuous filament bulky yarn is an organic yarn.

11. A sleeve according to claim 10, wherein the organic yarn is a polyester yarn.

12. A sleeve according to claim 1, wherein the density of the bulky yarn is from about 40% to about 60%.

13. A sleeve according to claim 12, wherein the density of the bulky yarn is from about 45% to about 55%.

14. A sleeve according to claim 9, wherein the density of the bulky yarn is from about 40% to about 60%.

15. A sleeve according to claim 14, wherein the density of the bulky yarn is from about 45% to about 55%.

16. A sleeve according to claim 5, wherein the bulky sleeve is diametrically expandable.

17. A sleeve according to claim 7, wherein the bulky sleeve is diametrically expandable.

18. A sleeve according to claim 9, wherein the bulky sleeve is diametrically expandable.

19. A sleeve according to claim 11, wherein the bulky sleeve is diametrically expandable.

20. A sleeve according to claim 1, wherein the overcoating is electrically insulating.

21. A sleeve according to claim 5, wherein the overcoating is electrically insulating.

22. A sleeve according to claim 7, wherein the overcoating is electrically insulating.

23. A sleeve according to claim 9, wherein the overcoating is electrically insulating.

24. A sleeve according to claim 11, wherein the overcoating is electrically insulating.

25. A sleeve according to claim 20, wherein the overcoating is a ceramic.

26. A sleeve according to claim 21, wherein the density of the bulky yarn is from about 40% to about 60%.

27. A sleeve according to claim 26, wherein the density of the bulky yarn is from about 45% to about 55%.

28. An electrical apparatus having at least one electrical conductor insulated with a bulky sleeve comprising:
   (a) a tubular sleeve which has a bulky interior and which is interthreaded from bulky, continuous filament yarn having a density of about 70% or less of the density of non-bulky yarn of the same composition and diameter;
   (b) an overcoating which is coated onto and substantially covers and seals the exterior surface of the tubular sleeve.
   (c) an impregnation composition which is electrically insulating and substantially fills the bulky interior of the sleeve between the electrical conductor and the overcoating.

29. An electrical apparatus according to claim 28, wherein the impregnation composition comprises a curable polymer.

30. A method for electrically insulating an elongate electrical conductor, comprising positioning at least a portion of a bulky sleeve around the elongate electrical conductor and introducing an electrically insulating impregnation composition between the electrical conductor and the sleeve to substantially fill the interior of the sleeve, wherein the bulky sleeve comprises:
   (a) a tubular sleeve which has a bulky interior and which is interthreaded from bulky, continuous filament yarn having a density of about 70% or less of the density of non-bulky yarn of the same composition and diameter; and
   (b) an overcoating which is coated onto and substantially covers and seals the exterior surface of the tubular sleeve.

31. A method according to claim 30, wherein the impregnation composition comprises a curable polymer.

32. A method according to claim 31, which further comprises the step of allowing the polymer to cure.

33. A method according to claim 30, which further comprises the steps of temporarily pulling back the sleeve along the electrical conductor, interconnecting the conductor with an electrical apparatus, and repositioning the sleeve along the electrical conductor after interconnection with the electrical apparatus.

* * * * *